United States Patent
Liang

(10) Patent No.: US 9,298,610 B2
(45) Date of Patent: Mar. 29, 2016

(54) DATA WRITING METHOD, MEMORY CONTROL CIRCUIT UNIT AND MEMORY STORAGE APPARATUS

(71) Applicant: PHISON ELECTRONICS CORP., Miaoli (TW)

(72) Inventor: Ming-Jen Liang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 55 days.

(21) Appl. No.: 14/291,004

(22) Filed: May 30, 2014

(65) Prior Publication Data

US 2015/0277785 A1  Oct. 1, 2015

(30) Foreign Application Priority Data

Mar. 31, 2014 (TW) .............................. 103111949 A

(51) Int. Cl.
*G06F 12/02* (2006.01)
*G06F 3/06* (2006.01)

(52) U.S. Cl.
CPC ............ *G06F 12/0246* (2013.01); *G06F 3/061* (2013.01); *G06F 3/0647* (2013.01); *G06F 3/0688* (2013.01); *G06F 12/0253* (2013.01); *G06F 2206/1014* (2013.01); *G06F 2212/1016* (2013.01); *G06F 2212/1036* (2013.01); *G06F 2212/7201* (2013.01); *G06F 2212/7202* (2013.01); *G06F 2212/7205* (2013.01); *G06F 2212/7207* (2013.01)

(58) Field of Classification Search
CPC ............ G06F 12/0246; G06F 12/0253; G06F 3/0604; G06F 3/0679; G06F 3/0688; G06F 3/0647; G06F 3/061
USPC ...................................... 711/103; 365/185.33
See application file for complete search history.

(56) References Cited

U.S. PATENT DOCUMENTS

| | | | | |
|---|---|---|---|---|
| 5,963,970 A | * | 10/1999 | Davis | G06F 12/0246 365/185.11 |
| 6,973,531 B1 | * | 12/2005 | Chang | G06F 12/0246 711/101 |
| 7,139,863 B1 | * | 11/2006 | Defouw | G06F 12/0246 365/185.33 |
| 7,849,275 B2 | * | 12/2010 | Danilak | G06F 11/008 711/154 |
| 2008/0082729 A1 | * | 4/2008 | Moon | G06F 12/0246 711/103 |
| 2009/0248965 A1 | * | 10/2009 | Lee | G06F 12/0246 711/103 |
| 2011/0010489 A1 | * | 1/2011 | Yeh | G06F 12/0246 711/103 |
| 2011/0191521 A1 | * | 8/2011 | Araki | G06F 12/0246 711/103 |
| 2011/0283053 A1 | * | 11/2011 | Yamashita | G06F 12/0246 711/103 |
| 2013/0021846 A1 | * | 1/2013 | Rao | G11C 16/3495 365/185.03 |
| 2014/0115410 A1 | * | 4/2014 | Kealy | G06F 11/00 714/704 |
| 2014/0189205 A1 | * | 7/2014 | Sinclair | G06F 12/0246 711/103 |

* cited by examiner

*Primary Examiner* — Hiep Nguyen
(74) *Attorney, Agent, or Firm* — Jianq Chyun IP Office

(57) ABSTRACT

A data writing method, and a memory control circuit unit and a memory storage apparatus using the method are provided. The method includes: grouping the logical units into a first area and at least a second area according to the write counts of the logical units configured on the memory apparatus. The method also includes: determining whether the logical unit corresponding to the received data belongs to the first area. The method further includes: if the logical unit corresponding to the received data belongs to the first area, programming the received data into a first active physical erasing unit, and if the logical unit corresponding to the received data belongs to the first area, programming the received data into a second active physical erasing unit. Accordingly, the method may improve the efficiency of a garbage collection operation.

18 Claims, 11 Drawing Sheets

DATA WRITING METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 103111949, filed on Mar. 31, 2014. The entirety of the above-mentioned patent application is hereby incorporated by reference herein and made a part of this specification.

BACKGROUND

1. Technology Field

The present invention is related to a data writing method for the rewritable non-volatile memory module, and a memory control circuit unit and memory storage apparatus using the method.

2. Description of Related Art

Along with the widespread of digital cameras, cell phones, and MP3 in recently years, the consumers' demand for storage media has increased drastically. Since a rewritable non-volatile memory is characterized by non-volatility of data, low power consumption, small volume, non-mechanical structure, and fast reading and writing speed, the rewritable non-volatile memory is the most adaptable memory to be applied in a portable electronic product, e.g., a notebook computer. A solid state drive is a storage apparatus adopting flash memory as storage medium. Therefore, the flash memory industry has become a very popular part of the electronic industry in recent years.

In the rewritable non-volatile memory storage apparatus, for example, the solid state disk (SSD), when the spare blocks are exhausted, the control chip system of the SSD needs to move valid data fast and perform the garbage collection operation to obtain new spare blocks. The efficiency of the garbage collection operation not only effects the speed of writing, but also effects the write amplification rate and the lifespan of the SSD.

During the process of file writing, the system data (for example, the file allocation table (FAT)) and user data may be written into the SSD, interleavely. In the host side, the order for writing data is writing the data first and then updating the FAT. In the page base algorithm, the order for writing data into the flash memory is the same as the order for writing data into the flash memory in the host side. And, in the same physical erasing unit, because the updating of the FAT will cause the old FAT become invalid, there may have a lot of invalid data sections in the same one physical erasing unit. If those invalid data sections are accounted for 10% of the entire data, it represents that there are 90% of data which is needed to be moved during the garbage collection operation such that the efficiency of the garbage collection becomes low. Therefore, how to increase the efficiency of garbage collection is one of the major subjects that the person skilled in the art develops with the effort.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data writing method, memory storage apparatus and memory control circuit unit using the method which are capable of effectively improving the efficiency of the garbage collection operation such that it may extend the lifespan of the memory storage apparatus.

According to an exemplary embodiment of the present invention, a data writing method for a rewritable non-volatile memory module is provided, wherein the rewritable non-volatile memory module has a plurality of physical erasing units, and each of the physical erasing units has a plurality of physical programming units. The data writing method includes: selecting a physical erasing unit from the physical erasing units of the rewritable non-volatile memory module as a first active physical erasing unit; selecting another physical erasing unit from the physical erasing units of the rewritable non-volatile memory module as a second active physical erasing unit; dividing a plurality of logical units which are configured on the rewritable non-volatile memory module into a first area and at least one second area; and programming first data into the first active physical erasing unit, wherein a host system indicates storing the first data into a first logical unit among the logical units and the first logical unit belongs to the first area. The data writing method also includes: programming second data into the second active physical erasing unit, wherein the host system indicates storing the second data into a second logical unit among the logical units and the second logical unit belongs to the second area. The data writing method further includes: programming third data into the second active physical erasing unit, wherein the host system indicates storing the third data into a third logical unit among the logical units and the third logical unit belongs to the second area.

According to an exemplary embodiment of the present invention, a data writing method for a rewritable non-volatile memory module is provided, wherein the rewritable non-volatile memory module has a plurality of physical erasing units, and each of the physical erasing units has a plurality of physical programming units. The data writing method includes: selecting a physical erasing unit from the physical erasing units of the rewritable non-volatile memory module as a first active physical erasing unit; selecting another physical erasing unit from the physical erasing units of the rewritable non-volatile memory module as a second active physical erasing unit; receiving a first write command from a host system and first data corresponding to the first write command; and determining whether the first data belongs to a file system of an operation system of the host system. The data writing method also includes, if the first data belongs to the file system, programming the first data into the first active physical erasing unit. The data writing method further includes, if the first data does not belong to the file system, programming the first data into the second active physical erasing unit.

According to an exemplary embodiment of the present invention, a memory control circuit unit for controlling a rewritable non-volatile memory module is provided. The memory control circuit unit includes: a host interface, a memory interface, and a memory management circuit. The host interface is configured to couple to a host system. The memory interface is configured to couple to the rewritable non-volatile memory module, wherein the rewritable non-volatile memory module has a plurality of physical erasing units, and each of the physical erasing units has a plurality of physical programming units. The memory management circuit is coupled to the host interface and the memory interface, and configured to select a physical erasing unit from the physical erasing units of the rewritable non-volatile memory module as a first active physical erasing unit. And, the memory management circuit is further configured to select another physical erasing unit from the physical erasing units of the rewritable non-volatile memory module as a second active physical erasing unit. The memory management circuit is further configured to divide a plurality of logical units which are configured on the rewritable non-volatile memory module into a first area and at least one second area. And, the memory management circuit is further configured to give a first command sequence to the rewritable non-volatile memory module to program first data into the first active physical erasing unit, wherein the host system indicates storing the first data into a first logical unit among the logical units and the first logical unit belongs to the first area. Moreover, the memory management circuit is further configured to give a second command sequence to the rewritable non-volatile memory module to program second data into the second active physical erasing unit, wherein the host system indicates storing the second data into a second logical unit among the logical units and the second logical unit belongs to the second area. Otherwise, the memory management circuit is further configured to give a third command sequence to the rewritable non-volatile memory module to program third data into the second active physical erasing unit, wherein the host system indicates that storing the third data into a third logical unit among the logical units and the third logical unit belongs to the second area.

According to an exemplary embodiment of the present invention, a memory control circuit unit for controlling a rewritable non-volatile memory module is provided. The memory control circuit unit included: a host interface, a memory interface, and a memory management circuit. The host interface is configured to couple to a host system. The memory interface is configured to couple to the rewritable non-volatile memory module, wherein the rewritable non-volatile memory module has a plurality of physical erasing units, and each of the physical erasing units has a plurality of physical programming units. The memory management circuit is coupled to the host interface and the memory interface, and configured to select a physical erasing unit from the physical erasing units of the rewritable non-volatile memory module as a first active physical erasing unit. The memory management circuit is further configured to select another physical erasing unit from the physical erasing units of the rewritable non-volatile memory module as a second active physical erasing unit. And, the memory management circuit is configured to receive a first write command from the host system and first data corresponding to the first write command, and then the memory management circuit is further configured to determine whether the first data belongs to a file system of an operation system of the host system. If the first data belongs to the file system, the memory management circuit is further configured to give a first command sequence to the rewritable non-volatile memory module to program the first data into the first active physical erasing unit. If the first data does not belong to the file system, the memory management circuit is further configured to give a second command sequence to the rewritable non-volatile memory module to program the first data into the second active physical erasing unit.

According to an exemplary embodiment of the present invention, a memory storage apparatus is provided. The memory storage apparatus includes: a connection interface unit, a rewritable non-volatile memory module, and a memory control circuit unit. The connection interface unit is configured to couple to a host system. The rewritable non-volatile memory module has a plurality of physical erasing units, and each of the physical erasing units has a plurality of physical programming units. The memory control circuit unit is coupled to the connection interface unit and the rewritable non-volatile memory module, and configured to select a physical erasing unit from the physical erasing units of the rewritable non-volatile memory module as a first active physical erasing unit, and select another physical erasing unit from the physical erasing units of the rewritable non-volatile memory module as a second active physical erasing unit. And then, the memory control circuit unit is further configured to divide a plurality of logical units which are configured on the rewritable non-volatile memory module into a first area and at least one second area. The memory control circuit unit is further configured to program first data into the first active physical erasing unit, wherein the host system indicates storing the first data into a first logical unit among the logical units and the first logical unit belongs to the first area. Moreover, the memory control circuit unit is further configured to program second data into the second active physical erasing unit, wherein the host system indicates storing the second data into a second logical unit among the logical units and the second logical unit belongs to the second area. And the memory control circuit unit is further configured to program third data into the second active physical erasing unit, wherein the host system indicates storing the third data into a third logical unit among the logical units and the third logical unit belongs to the second area.

According to an exemplary embodiment of the invention, a memory storage apparatus is provided, including: a connection interface unit, a rewritable non-volatile memory module, and a memory control circuit unit. The connection interface unit is configured to couple to a host system. The rewritable non-volatile memory module has a plurality of physical erasing units, and each of the physical erasing units has a plurality of physical programming units. The memory control circuit unit is coupled to the connection interface unit and the rewritable non-volatile memory module, and is configured to select a physical erasing unit from a plurality of physical erasing units of the rewritable non-volatile memory module as a first active physical erasing unit. And the memory control circuit unit is further configured to select another physical erasing unit from a plurality of physical erasing units of the rewritable non-volatile memory module as a second active physical erasing unit. The memory control circuit unit is configured to receive a first write command from a host system and first data corresponding to the first write command, and then the memory control circuit unit is further configured to determine whether the first data belongs to a file system of an operation system of the host system. If the first data belongs to the file system, the memory control circuit unit is further configured to program the first data into the first active physical erasing unit. If the first data does not belong to the file system, the memory control circuit unit is further configured to program the first data into the second active physical erasing unit.

Accordingly, the present exemplary embodiments may gather the data which has high updating frequency and store this kind of data into a physical erasing unit to increase the ratio of the invalid data of this physical erasing unit such that the amounts of data which is needed to be moved during the garbage collection operation of this physical erasing unit would be decreased and the time for performing the garbage collection operation is saved. Also, the present exemplary embodiments may further decrease the times of performing the garbage collection to increase the efficiency of the garbage collection operation such that it may decrease the write amplification ratio and extend the lifespan of the memory storage apparatus.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 10-11 are diagrams illustrating an example of writing data into the second active physical erasing unit according to one embodiment of.

DESCRIPTION OF THE EMBODIMENTS

Figure 1:
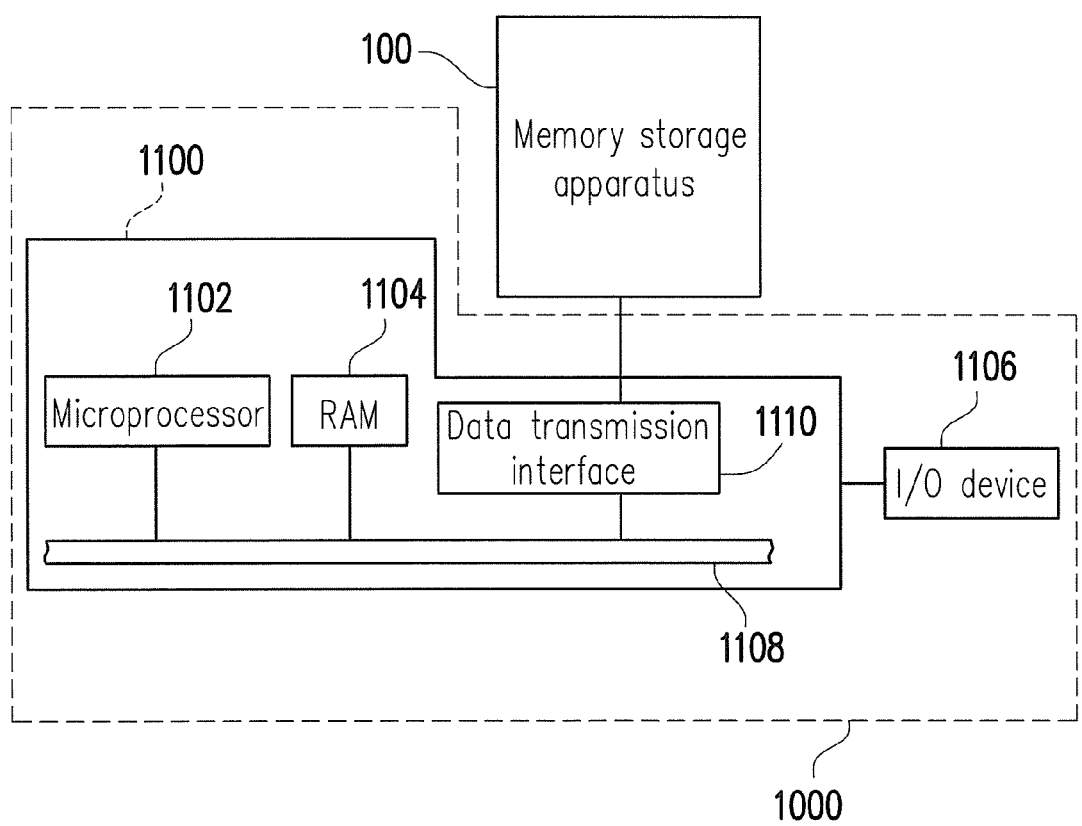
FIG. 1 illustrates a host system and a memory storage apparatus according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

[First Exemplary Embodiment]

FIG. 1 illustrates a host system and a memory storage apparatus according to an exemplary embodiment of the invention.

Figure 2:
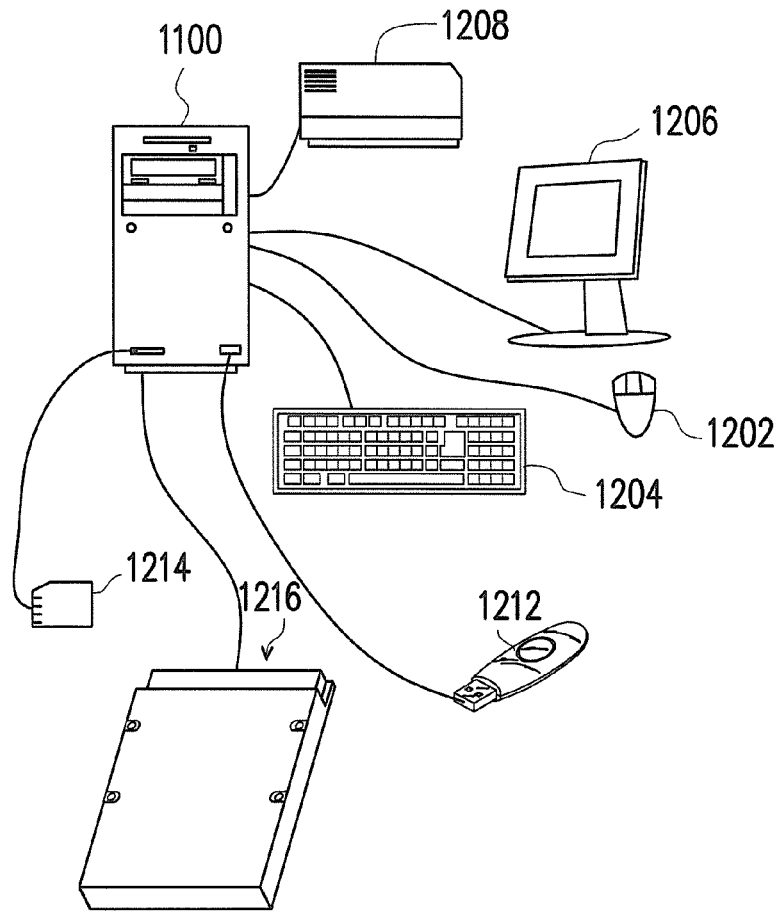
FIG. 2 illustrates a computer, an input/output (I/O) device, and a memory storage apparatus according to the exemplary embodiment.

Referring to FIG. 1, a host system 1000 in most cases includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 2. It should be understood, the devices depicted in FIG. 2 should not be construed as limitations to the invention, and the I/O device 1106 may further include other devices as well.

In the exemplary embodiment, the memory storage apparatus 100 is electrically connected to other devices of the host system 1000 through the data transmission interface 1110. By the operations of the microprocessor 1102, the random access memory (RAM) 1104 and the Input/Output (I/O) device 1106, the data can be written into the memory storage apparatus 100 or can be read from the memory storage apparatus 100. For instance, the memory storage apparatus 100 may be a non-volatile memory storage apparatus, such as a flash drive 1212, a memory card 1214, or a solid state drive (SSD) 1216 as shown in FIG. 2.

Figure 3:
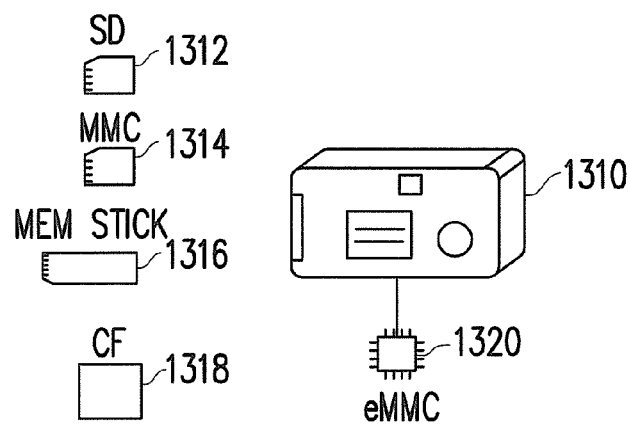
FIG. 3 illustrates a host system and a memory storage apparatus according to the exemplary embodiment.

Generally, the host system 1000 can substantially be any system used together with the memory storage apparatus 100 for storing data. Even though the host system 1000 is described as a computer system in the exemplary embodiment, the host system 1000 in another exemplary embodiment of the invention may be a digital camera, a video camera, a communication device, an audio player, a video player, and so on. For instance, if the host system is a digital camera (video camera) 1310, the rewritable non-volatile memory storage apparatus is an SD card 1312, an MMC card 1314, a memory stick 1316, a CF card 1318 or an embedded storage apparatus 1320 (as shown in FIG. 3). The embedded storage device 1320 includes an embedded MMC (eMMC). It should be noted that the eMMC is directly electrically connected to a substrate of the host system.

Figure 4:
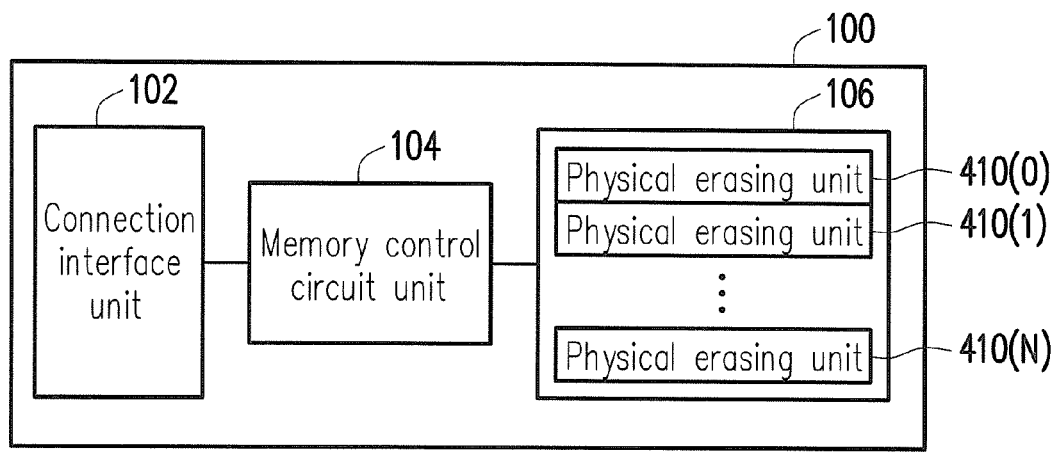
FIG. 4 is a schematic block diagram illustrating the memory storage apparatus depicted in FIG. 1.

FIG. 4 is a schematic block diagram illustrating the memory storage apparatus depicted in FIG. 1.

Referring to FIG. 4, the memory storage apparatus 100 includes a connection interface unit 102, a memory control circuit unit 104, and a rewritable non-volatile memory module 106.

In the exemplary embodiment, the connection interface unit 102 complies with the serial advanced technology attachment (SATA) standard. However, the invention is not limited thereto, and the connection interface unit 102 may comply with the parallel advanced technology attachment (PATA) standard, the Institute of Electrical and Electronic Engineers (IEEE) 1394 standard, the peripheral component interconnect (PCI) express standard, the universal serial bus (USB) standard, the ultra high speed-I (UHS-I) standard, the ultra high speed-II (UHS-II) standard, the memory sick (MS) standard, the multi media card (MMC) standard, the compact flash (CF) standard, the integrated device electronics (IDE) standard, or other suitable standards. In the exemplary embodiment, the connection interface unit may be sealed with the memory control circuit unit in a chip or disposed outside of a chip including the memory control circuit unit.

The memory control circuit unit 104 is configured for executing a plurality of logic gates or control commands which are implemented in a hardware form or in a firmware form and issuing the command sequences to the rewritable non-volatile memory module 106 to perform the operations such as data writing, reading or erasing according to the commands of the host system 1000.

The rewritable non-volatile memory module 106 is electrically connected to the memory control circuit unit 104 and is configured to store the data written by the host system 1000. The rewritable non-volatile memory module 106 includes a plurality of physical erasing units 410(0)-410(N). For instance, the physical erasing units 410(0)-410(N) can belong to the same memory die or different memory dies. Each of the physical erasing units includes a plurality of physical programming units, for example, in the exemplary embodiment of the invention, every physical erasing unit includes 258 physical programming units, wherein the physical programming units which belong to the same physical erasing unit can be written separately but erased altogether at the same time. However, the present invention is not limited thereto, and each of the physical erasing units may also be constituted by 64, 256, or any other number of physical programming units.

To be more specific, the physical erasing unit is the minimum erasing unit. That is to say, each of the physical erasing units has a minimum number of memory cells for being erased altogether. The physical programming unit is the minimum programming unit. Namely, a physical programming unit is the minimum unit for writing the data. Each of the physical programming units usually includes a data bit area and a redundant bit area. The data bit area includes a plurality of physical accessing addresses for storing user data, and the redundant bit area is used for storing system data (e.g., control information and error correcting code (ECC)). In the exemplary embodiment, the data bit area of every physical programming unit may include 4 physical accessing addresses, and the size of one physical accessing address is 512 bytes. However, in other exemplary embodiment, the data bit area also may include more or less number of the physical accessing addresses, and the present invention is not limited thereto. For example, in an exemplary embodiment, a physical erasing unit is a physical block, and a physical programming unit is a physical page or a physical sector, but the invention is not limited thereto.

In the exemplary embodiment, the rewritable non-volatile memory module 106 is the multi level cell (MLC) NAND flash memory module (Namely, a flash memory module with memory cells which may store two bits of data, and refer to MLC NAND flash memory module hereinafter), however, the invention is not limited thereto. The rewritable non-volatile memory module 106 may also be a single level cell (SLC) NAND flash memory module (Namely, a flash memory module with memory cells which may store one bit of data), a trinary level cell (TLC) NAND flash memory module (Namely, a flash memory module with memory cells which may store three bits of data), or other flash memory module or other memory modules with the same feature.

Figure 5:
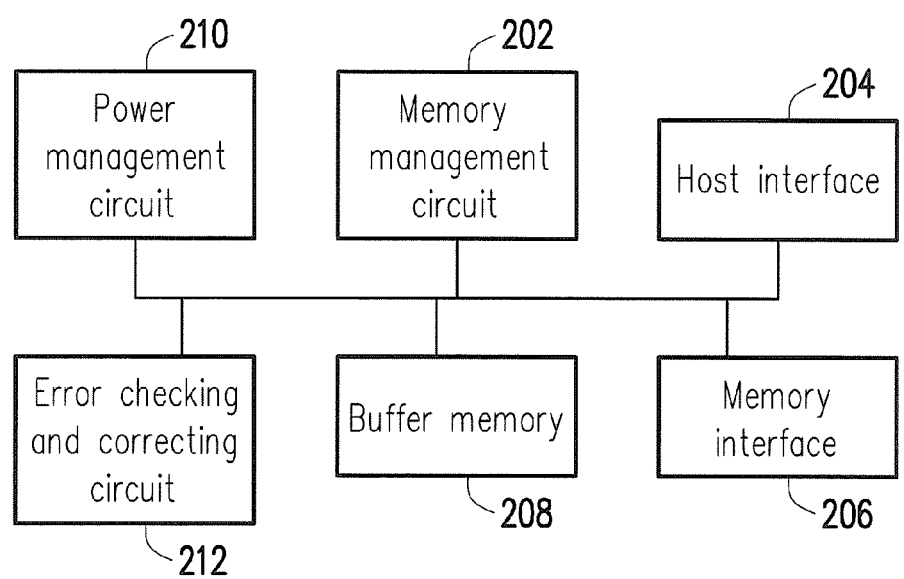
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 104 includes a memory management circuit 202, a host interface 204 and a memory interface 206.

The memory management circuit 202 is configured to control the whole operation of the memory control circuit unit 104. Particularly, the memory management circuit 202 has a plurality of control instructions, and when the memory storage apparatus 100 is operated, the control instructions are executed to perform a data writing operation, a data reading operation, a data erasing operation, and so on.

In the exemplary embodiment, the control instructions of the memory management circuit 202 are implemented in a form of a firmware. For example, the memory management circuit 202 includes a microprocessor unit (not shown) and a read-only memory (ROM, not shown), where the control instructions are burned into the read-only memory. When the memory storage apparatus 100 is operated, the control instructions are executed by a microprocessor unit to perform a data writing operation, a data reading operation, a data erasing operation, and so on.

In another exemplary embodiment, the control instructions of the memory managing circuit 202 may also be stored in a specific block (for example, a system block in a memory module exclusively used for storing system data) of the rewritable non-volatile memory module 106 as a programming code. Moreover, the memory managing circuit 202 includes a microprocessor unit (not shown), a read-only memory (ROM, not shown) and a random access memory (not shown). In particular, the ROM has a boot code, and when the memory control circuit unit 104 is enabled, the microprocessor unit first executes the boot code to load the control driving code from the rewritable non-volatile memory module 106 into the RAM of the memory management circuit 202. Afterward, the microprocessor unit then executes the control driving code to perform a data writing operation, a data reading operation, a data erasing operation, and so on.

Furthermore, in another exemplary embodiment, the control commands of the memory management circuit 202 are implemented in a form of hardware. For example, the memory management circuit 202 includes a micro controller, a memory cell managing circuit, a memory writing circuit, a memory reading circuit, a memory erasing circuit and a data processing circuit. The memory managing circuit, the memory writing circuit, the memory reading circuit, the memory erasing circuit and the data processing circuit are electrically connected to the micro controller. Wherein, the memory management circuit is configured for managing the physical erasing units of the rewritable non-volatile memory module 106; the memory writing circuit is configured for issuing the write command to the rewritable non-volatile memory module 106 in order to write the data into the rewritable non-volatile memory module 106; the memory reading circuit is configured for issuing the read command to the rewritable non-volatile memory module 106 in order to read the data from the rewritable non-volatile memory module 106, the memory erasing circuit is configured for issuing the erasing command to the rewritable non-volatile memory module 106 in order to erase the data in the rewritable non-volatile memory module 106, and the data processing circuit is configured for processing the data which is intended to be written into the rewritable non-volatile memory module 106 and the data which is intended to be read from the rewritable non-volatile memory module 106.

The host interface 204 is electrically connected to the memory management circuit 202 and configured to receive and identify the commands and the data transmitted by the host system 1000. Namely, the commands and data transmitted by the host system 1000 are passed to the memory management circuit 202 through the host interface 204. In the exemplary embodiment, the host interface 204 complies with the SATA standard. However, it should be understood, the present invention is not limited hereto, and the host interface 204 can also comply with the PATA standard, the IEEE 1394 standard, the PCI Express standard, the USB standard, the UHS-I standard, the UHS-II standard, the MS standard, the MMC standard, the CF standard, the IDE standard, or any other appropriate data transmission standard.

The memory interface 206 is electrically connected to the memory managing circuit 202 for accessing the rewritable non-volatile memory module 106. In other words, the data intended to be written to the rewritable non-volatile memory module 106 is converted to an acceptable format for the rewritable non-volatile memory module 106 by the memory interface 206.

In an exemplary embodiment, the memory control circuit unit 104 further includes a buffer memory 208, a power management circuit 210 and an error checking and correcting circuit 212.

The buffer memory 208 is electrically connected to the memory management circuit 202 and configured to temporarily store the data and commands from the host system 1000 or the data from the rewritable non-volatile memory module 106.

The power managing circuit 210 is electrically connected to the memory management circuit 202 and configured to control the power of the memory storage device 100.

The error checking and correcting circuit 212 is electrically connected to the memory management circuit 202 and configured to perform an error checking and correcting process to assure the accuracy of data. To be more specific, when the memory management circuit 202 receives a write command from the host system 1000, the error checking and correcting circuit 212 generates an error checking and correcting code (ECC code) corresponding to the data of the write command, and the memory management circuit 202 writes the data corresponding to the write command and the corresponding ECC code into the rewritable non-volatile memory module 106. Afterwards, when the memory management circuit 202 reads the data from the rewritable non-volatile memory module 106, the corresponding error checking and correcting code is also be read, and the error checking and correcting circuit 212 executes the error checking and correcting process to the read data according to the ECC code.

Figure 6:
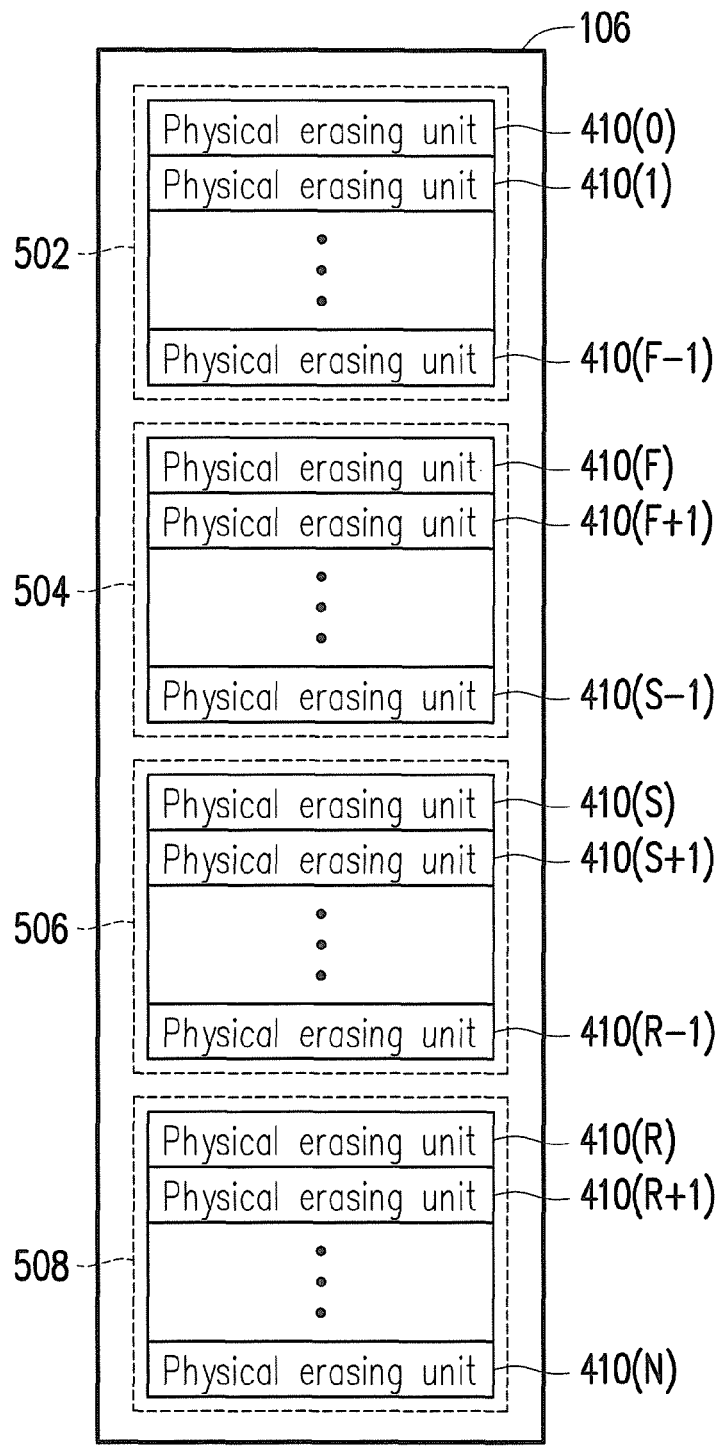
FIG. 6 and FIG. 7 are exemplary diagrams of managing physical erasing units according to the first exemplary embodiment.
Figure 7:
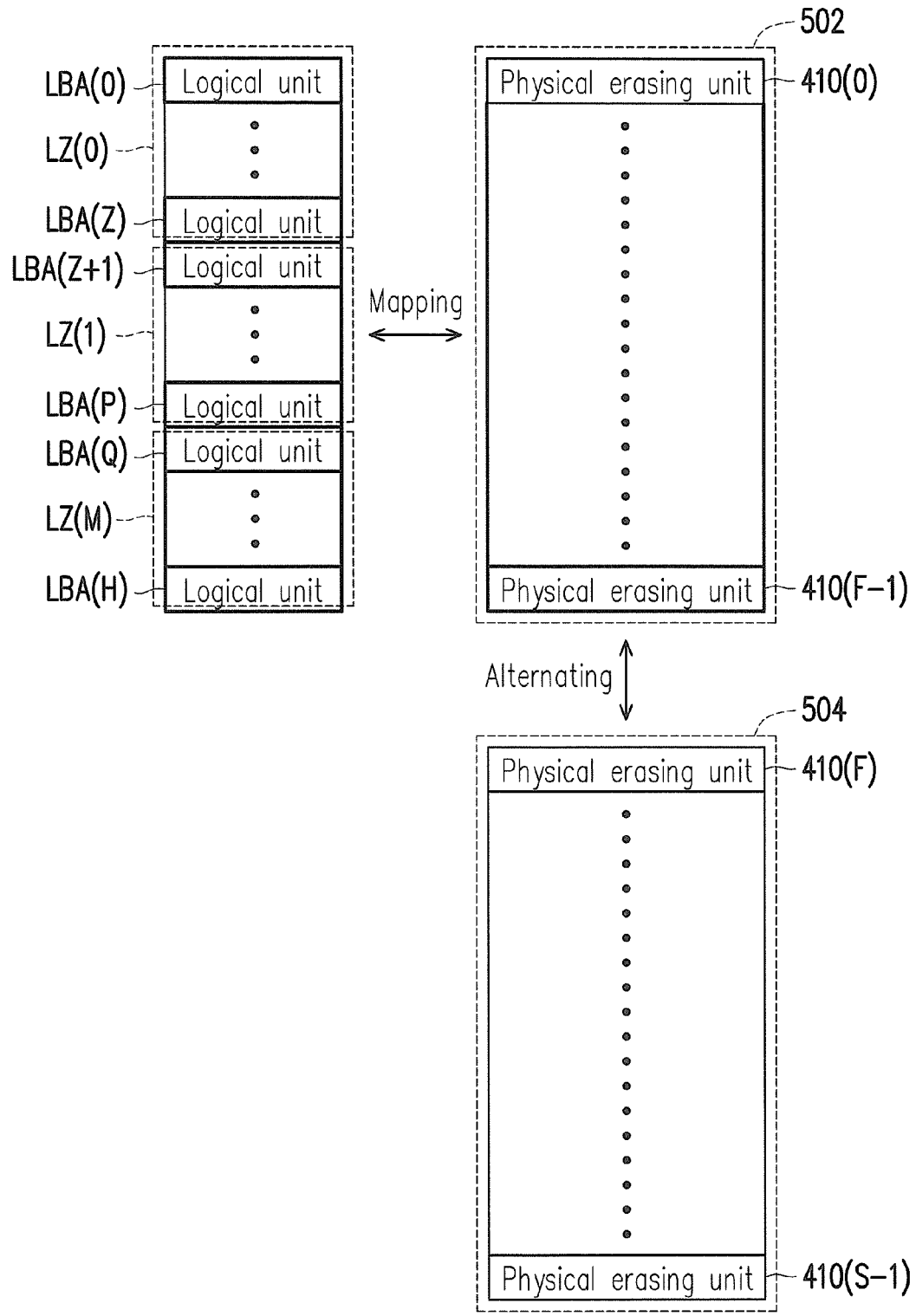

FIG. 6 and FIG. 7 are exemplary diagrams illustrating managing physical erasing units according to an exemplary embodiment.

Referring to FIG. 6, the memory control circuit unit 104 (or memory management circuit 202) logically groups the physical erasing units 410(0)-410(N) into a data area 502, a spare area 504, a system area 506, and a replacement area 508.

The physical erasing units logically belonging to the data area 502 and the spare area 504 are configured for storing data from the host system 1000. To be specific, the physical erasing units of the data area 502 are the physical erasing units which have been used for storing data, and the physical erasing units of the spare area 504 are the physical erasing units which are used for substituting the physical erasing units of the data area 502. Namely, when a write command and data to be written are received from the host system 1000, the memory management circuit 202 selects physical erasing units from the spare area 504 and writes the data into the selected physical erasing units for substituting the physical erasing units of the data area 502.

The physical erasing units logically belonging to the system area 506 are used for recording system data. For instance, the system data includes the manufacturers and models of the rewritable non-volatile memory module, the number of physical erasing units in the rewritable non-volatile memory modules, the number of physical programming units in each physical erasing unit, and so on.

The physical erasing units logically belonging to the replacement area 508 are used in a bad physical erasing unit replacement procedure for replacing damaged physical erasing units. To be specific, if there still exists normal physical erasing units in the replacement area 508, and a physical erasing unit in the data area 502 is damaged, the memory management circuit 202 selects a normal physical erasing unit from the replacement area 508 to replace the damaged physical erasing unit.

In particular, the numbers of physical erasing units in the data area 502, the spare area 504, the system area 506 and the replacement area 508 are various based on different memory module standards. Additionally, it has to be understood that the grouping relationships of grouping the physical erasing units into the data area 502, the spare area 504, the system area 506 and the replacement area 508 are dynamically changed during the operations of the memory storage apparatus 100. For example, when a physical erasing unit in the spare area 504 is damaged and then replaced by a physical erasing unit of the replacement area 508, the physical erasing unit of the replacement area 508 is associated with the spare area 504.

Referring to FIG. 7, the memory control circuit unit 104 (or memory management circuit 202) may configure a plurality of logical units LBA(0)~LBA(H) for mapping the physical erasing units of the data area 502, wherein each of the logical units includes a plurality of logical sub-units for mapping the physical programming units of the corresponding physical erasing units. Also, when the host system 1000 intends to write data into a logical unit or update the data stored in a logical unit, the memory control circuit unit 104 (or memory management circuit 202) may select a physical erasing unit to write the data for substituting the physical erasing units of the data area 502. In the exemplary embodiment, the logical sub-unit may be a logical page or a logical sector.

In order to recognize in which physical erasing unit the data of each logical unit is stored, in the exemplary embodiment, the memory control circuit unit 104 (or memory management circuit 202) may record the mapping relation between logical units and physical erasing units. Also, when the host system 1000 intends to access data from a logical sub-units, the memory control circuit unit 104 (or memory management circuit 202) may identify a logical unit that this logical sub-unit belongs to, and give a corresponding command sequence to access data from the physical erasing unit mapped to this logical unit. For example, in the exemplary embodiment, memory control circuit unit 104 (or memory management circuit 202) may store a logical-physical address mapping table in the rewritable non-volatile module 106 to record each of the physical erasing units mapping to each of the logical units, and the memory control circuit unit 104 (or memory management circuit 202) may load the logical-physical address mapping table into the buffer memory 208 for maintaining when it intends to access data.

As the foregoing description, in the exemplary embodiment, the rewritable non-volatile memory module 106 of the memory storage apparatus 100 performs the management based on the physical programming unit, so that when performing a write command, no matter what logical sub-unit of a logical unit the data intends to write into, the memory control circuit unit 104 (or memory management circuit 202) is always configured to write data by one physical programming unit after one physical programming unit way. Specifically, the memory control circuit unit 104 (or memory management circuit 202) may select an empty physical erasing unit as a currently used physical erasing unit (hereinafter, refers to the active physical erasing unit) to write the data. Also, when this currently used physical erasing unit is full, the memory control circuit unit 104 (or memory management circuit 202) may select another empty physical erasing unit from the spare area 504 as the active physical erasing unit for subsequently writing the data corresponding to the write command from the host system 1000. Particularly, for preventing the physical erasing units in the spare area 504 from exhausting, when the memory control circuit unit 104 (or memory management circuit 202) intends to select a physical erasing unit from the spare area 504 and the number of the physical erasing units in the spare area 504 goes down to a predetermined garbage collection threshold value, the memory control circuit unit 104 (or memory management circuit 202) may perform a data merge process first to let the data of at least one physical erasing unit in the data area 502 become invalid data, and associate the physical erasing unit, in which all data stored is invalid data, from data area 502 to spare area 504 such that the number of the physical erasing units in the spare area 504 will be larger than the predetermined garbage collection threshold value. For example, when performing the data merge process, the memory control circuit unit 104 (or memory management circuit 202) at least needs to use one empty physical erasing unit, so that the garbage collection threshold value is at least set to be a number larger than 1.

Specifically, the memory control circuit unit 104 (or memory management circuit 202) may select a physical erasing unit (hereinafter, refers to the first active physical erasing unit) and another physical erasing unit (hereinafter, refers to the second active physical erasing unit), wherein the first active physical erasing unit may be configured to store data which is updated more often. To be more specific, the data stored in the first active physical erasing unit is updated more often such that the ratio of the invalid data in the first active physical erasing unit is larger than the ratio of the invalid data in the second active physical erasing unit. For example, the memory control circuit unit 104 (or memory management circuit 202) may select a physical erasing unit 410(F) of the spare area 504 as the first active physical erasing unit and select a physical erasing unit 410(F+1) of the spare area 504 as the second active physical erasing unit.

It should be mentioned, in the exemplary embodiment, although the memory control circuit unit 104 (or memory management circuit 202) may select physical erasing units of the spare area 504 as the first active physical erasing unit and the second active physical erasing unit, however, the present invention is not limited thereto. For example, in another exemplary embodiment, the memory control circuit unit 104 (or memory management circuit 202) may further divide a portion of physical erasing units of the spare area 504 into a first active area and a second active area, and use a physical erasing unit of the first active area as the first active physical erasing unit and use a physical erasing unit of the second active area as the second active physical erasing unit. In another exemplary embodiment here, the memory control circuit unit 104 (or memory management circuit 202) may further divide a portion of physical erasing units of the spare area into a first active area and a second active area according to the erasing counts of physical erasing units such that the erasing counts of the physical erasing units of the first active area are smaller than the physical erasing units of the second active area, so that, it may have the effect of wear-leveling.

In the exemplary embodiment, the memory control circuit unit 104 (or memory management circuit 202) may divide a plurality of logical units LBA(0)~LBA(H) of the rewritable non-volatile memory module 106 into a plurality of logical areas LZ(0)~LZ(M). In the exemplary embodiment, the memory control circuit unit 104 (or memory management circuit 202) may further group the logical units into the logical areas according to the writing counts of each of the logical units. For example, it assumed that the writing counts of the logical units in logical area LZ(0) are larger than the writing counts of the logical units in logical area LZ(1), and the writing counts of the logical units in logical area LZ(1) are larger than the writing counts of the logical units in logical area LZ(2), and etc. So that, the writing counts of each of the logical units which are grouped into the logical area LZ(0) are larger than the writing counts of each of the logical units in the logical areas LZ(1)~LZ(M). It should be mentioned, the corresponding amounts of the logical units are respectively included in the foregoing grouped logical areas LZ(0)~LZ(M) may be the same or different, and the present invention is not limited thereto. That is, in the foregoing example, if the logical units LBA(0)~LBA(H) in the logical areas LZ(0)~LZ(M) are sorted from large to small according to the writing counts, the memory control circuit unit 104 (or memory management circuit 202) may group front a predetermined number of the logical units into the logical area LZ(0). Or, in another exemplary embodiment, the amount of the logical units of the logical area LZ(0) may be the same or different to other logical areas, and the amount of the logical units which is divided into the logical area LZ(0) may be set according to the manufactory or other methods, and the present invention is not limited thereto.

In the foregoing example of the exemplary embodiment, because the writing counts of the logical units in the logical LZ(0) are all larger than the writing counts of the logical units in the other logical areas, the memory control circuit unit 104 (or memory management circuit 202) may group the logical area LZ(0) into the first area and group the other logical areas which are not the first area (e.g., the logical areas LZ(1)~LZ(M)) into the second area. And, the memory control circuit unit 104 (or memory management circuit 202) may write the data which is about to store in the logical units of the first area into foregoing the first active physical erasing unit 410(F), and write the data which is about to store in the logical units of the second area into foregoing the second active physical erasing unit 410(F+1). It should be mentioned, when the first active physical erasing unit 410(F) or the second active physical erasing unit 410(F+1) are full, the memory control circuit unit 104 (or memory management circuit 202) may select another physical erasing unit from the spare area 504 as another first active physical or another second active physical erasing unit to write the data.

For example, it assumed that the logical units LBA(0) and LBA(Z) are belong to the first area, and the logical unit LBA(Z+1) belongs to the second area. When the memory control circuit unit 104 (or memory management circuit 202) receives a write command (hereinafter, refers to the first write command) form the host system 1000 and data (hereinafter, refers to the first data) corresponding to the first write command, and the host system 1000 indicates storing the first data into one logical unit (for example, the logical unit LBA(0), refers to the first logical unit LBA(0) hereinafter) of the logical units through the first write command, the memory control circuit unit 104 (or memory management circuit 202) may first identify that the first logical unit LBA(0) belongs to the first area and write the first data into the physical programming unit of the first active physical erasing unit 410(F), and then map the logical sub-unit, which is corresponding to the first data, in the first logical unit LBA(0) to the physical programming units, which is stored the first data, in the first active physical erasing unit 410(F).

Figure 8:
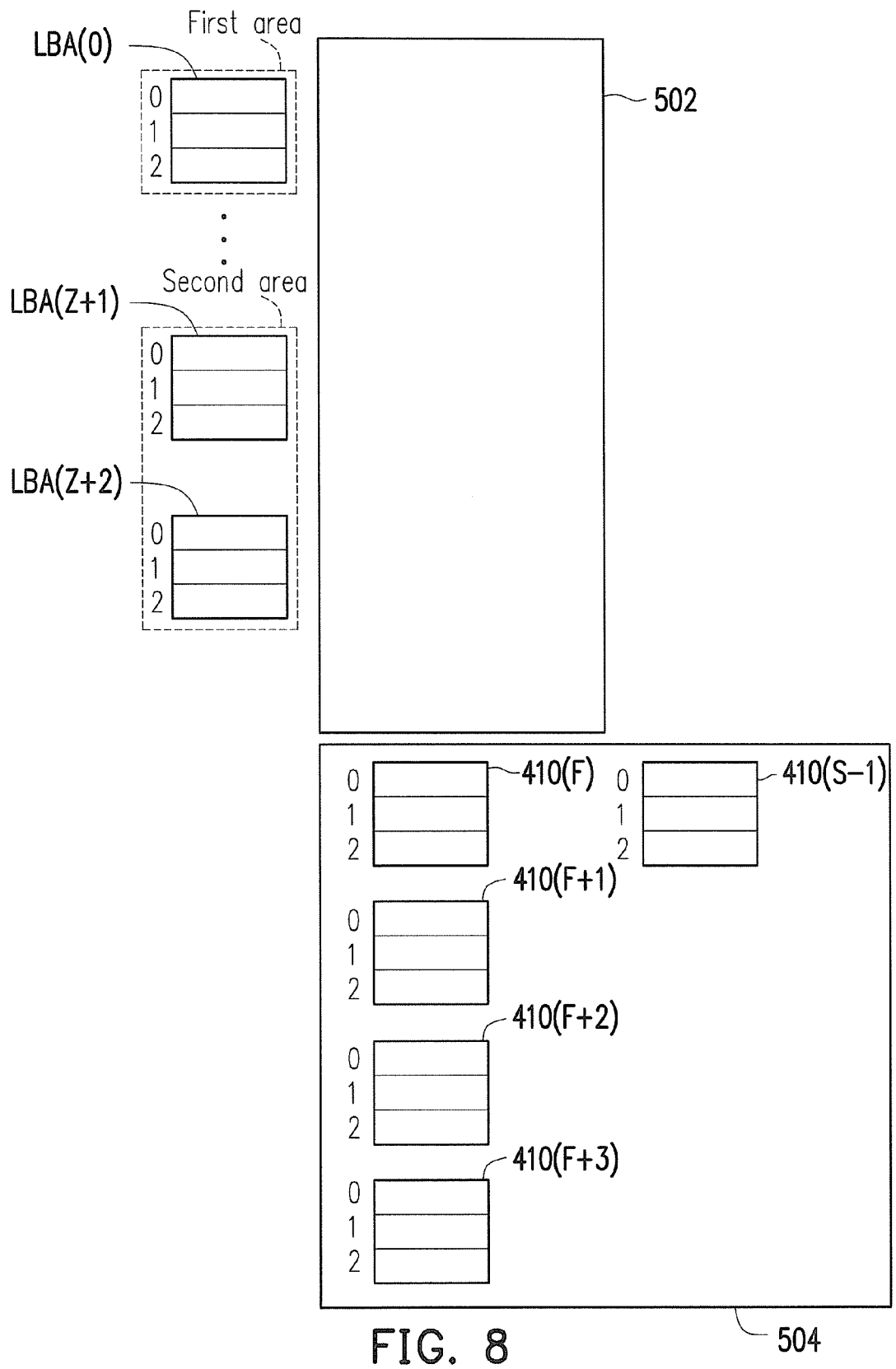
FIGS. 8-9 are diagrams illustrating an example of writing data into the first active physical erasing unit according to one embodiment.
Figure 9:
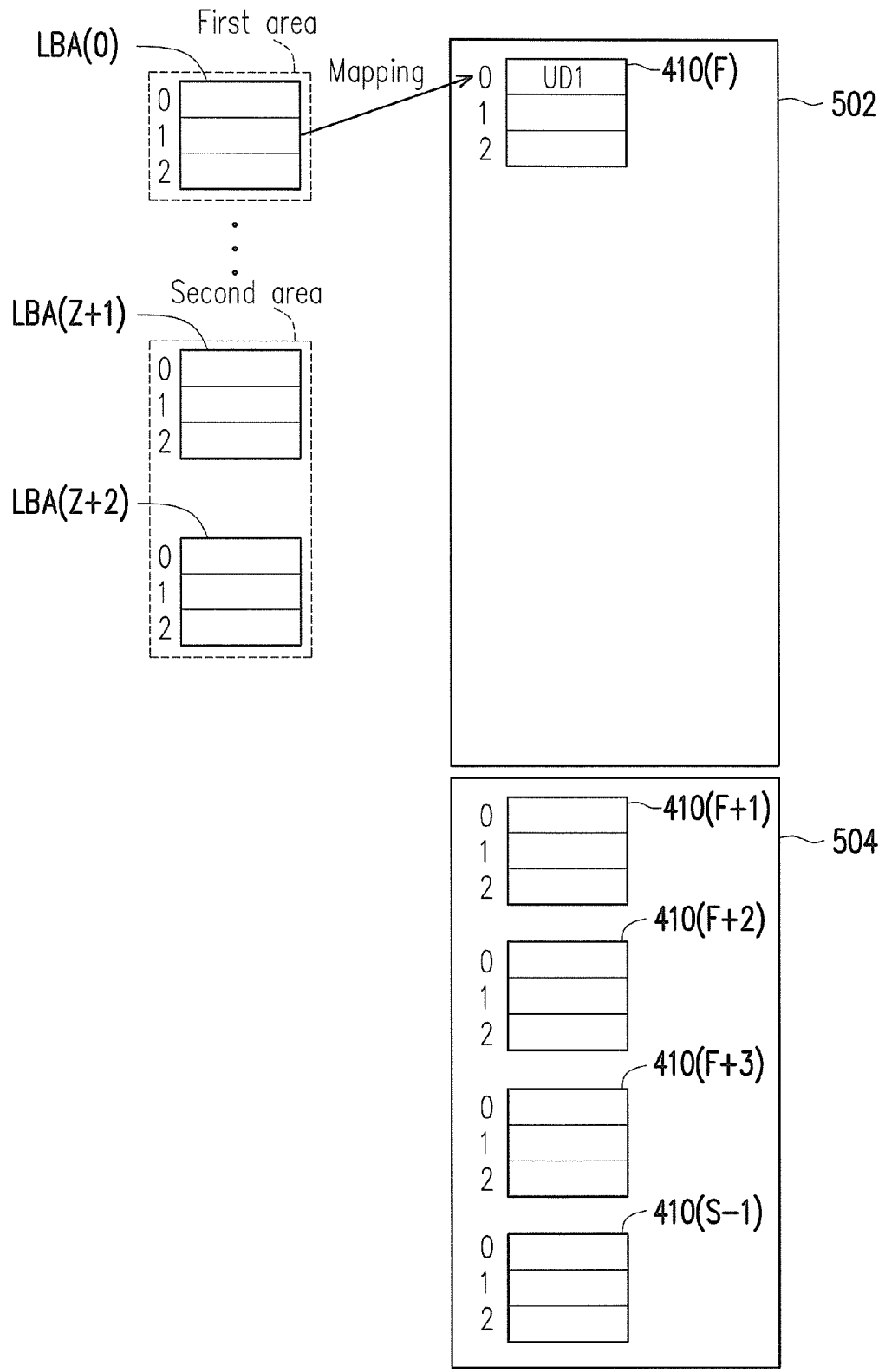

FIGS. 8-9 are diagrams illustrating an example of writing data into the first active physical erasing unit according to one embodiment of the invention.

Referring to FIG. 8, for ease of description, it assumed that there is no physical erasing units mapped to the logical units at the beginning (Namely, the memory storage apparatus 100 is never written the user data after setting up the memory modules) in the data area 502, and there are physical erasing units 410(F)~410(S−1) in the spare area 504, wherein each physical erasing unit has three physical programming units, and the data, intended to be written into each physical erasing unit, must be written by the order of the physical programming units, and the capacity of each one of the logical sub-units is the same as the capacity of one programming physical programming unit. Also, the memory control circuit unit 104 (or memory management circuit 202) identifies that the logical unit LBA(0) belongs to the first area, and the logical units LBA(Z+1) and LBA(Z+2) belong to the second area.

Referring to FIG. 9, in the foregoing example, the memory control circuit unit 104 (or memory management circuit 202) receives the first write command from the host system 1000, and the first data UD1 corresponding to the first write command. At the same time, the host system 1000 indicates storing the first data UD1 into the first logical unit LBA(0) through the first write command, and the first data UD1 belongs to the 1st logical sub-unit of the first logical unit LBA(0). And, the memory control circuit unit 104 (or memory management circuit 202) may first determine whether the logical unit LBA(0) belongs to the first area. In this example, the first logical unit LBA(0) belongs to the first area and there is no first active physical erasing unit existed in the data area 502. Therefore, the memory control circuit unit 104 (or memory management circuit 202) may select a physical erasing unit 410(F) from the spare area 504 as the first active physical erasing unit, write the first data UD1 into the 0th physical programming unit of the first active physical erasing unit 410(F), and map the 1st logical sub-unit, which is corresponding to the first data UD1, in the first logical unit LBA(0) to the 0th physical programming unit, which is stored the first data UD1, in the first active physical erasing unit 410(F).

Figure 10:
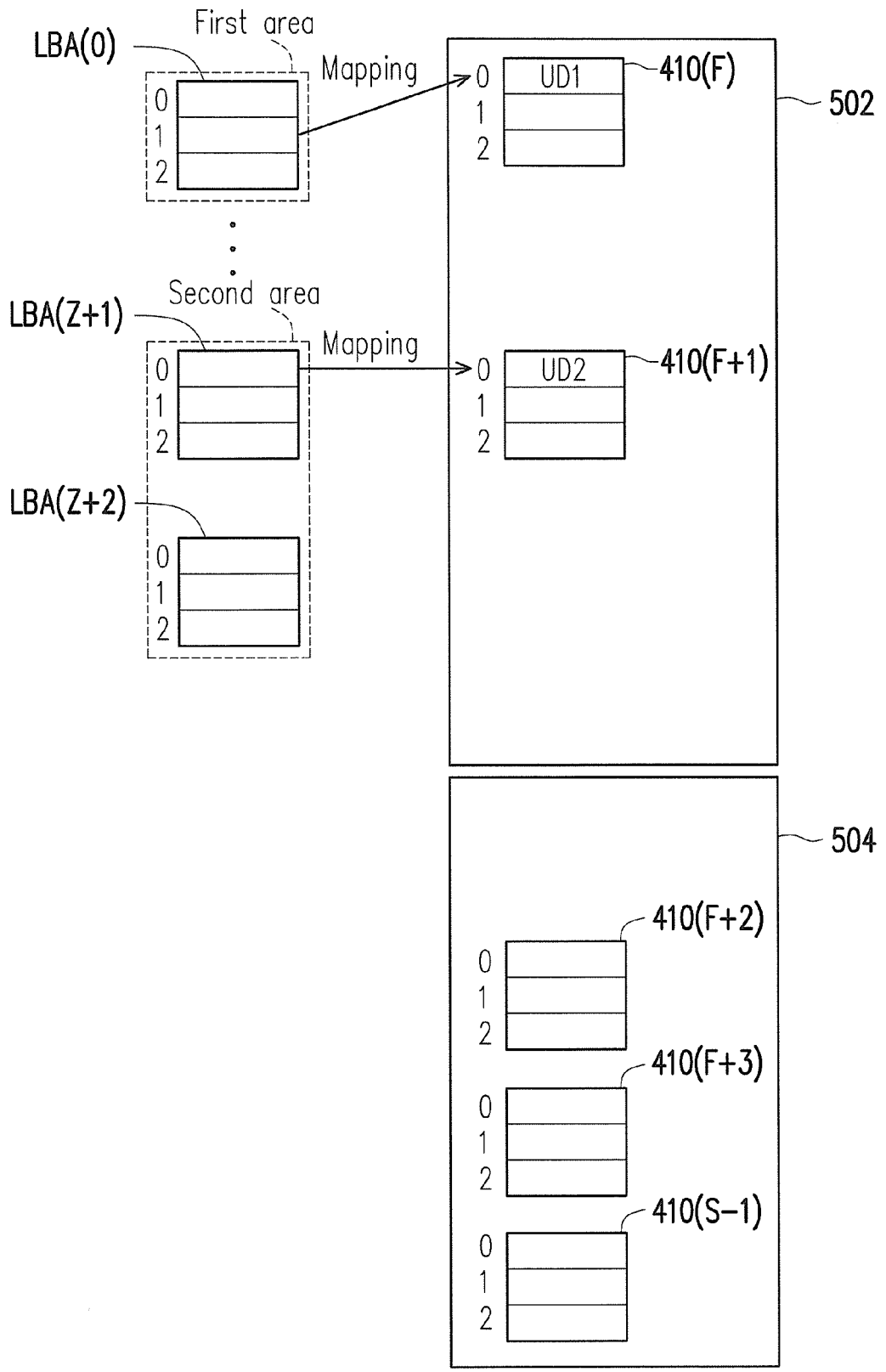
Figure 11:
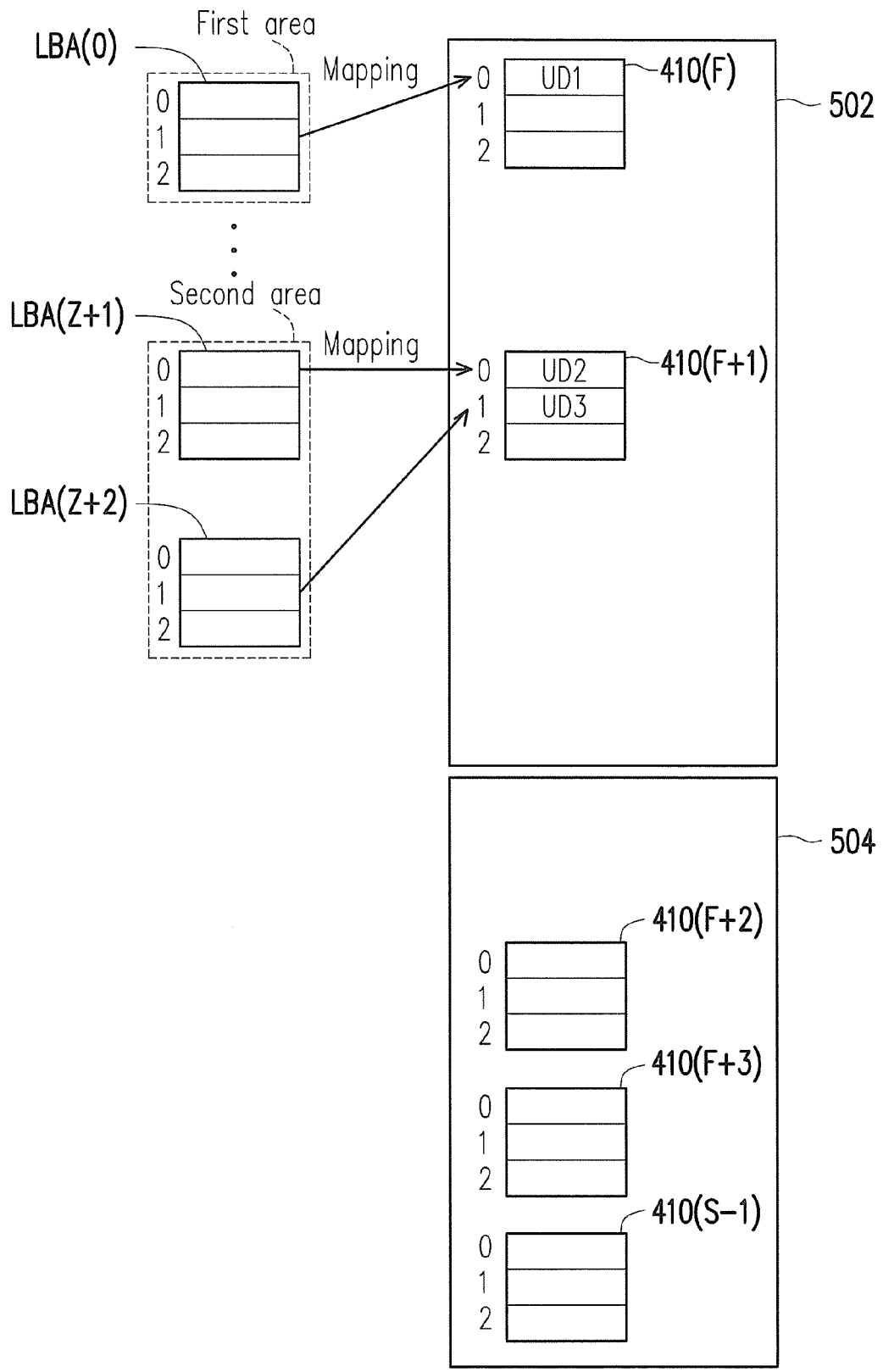

FIGS. 10~11 are diagrams illustrating an example of writing data into the second active physical erasing unit according to one embodiment of the invention.

Referring to FIG. 10, when the memory control circuit unit 104 (or memory management circuit 202) receives another write command (hereinafter, refers to the second write command) form the host system 1000 and data (hereinafter, refers to the second data UD2) corresponding to the second write command. At the same time, when the host system 1000 indicates storing the second data UD2 into one logical unit (for example, the logical unit LBA(Z+1), refers to the second logical unit LBA(Z+1) hereinafter) through the second write command, and the second data UD2 belongs to the 0th logical sub-unit of the second logical unit LBA(Z+1). And, the memory control circuit unit 104 (or memory management circuit 202) may first determine whether the second logical unit LBA(Z+1) belongs to the first area. In this example, the second logical unit LBA(Z+1) belongs to the second area and there is no second active physical erasing unit existed in the data area 502. Therefore, the memory control circuit unit 104 (or memory management circuit 202) may take a physical erasing unit 410(F+1) from the spare area 504 as the second active physical erasing unit, and write the second data UD2 into the 0th physical programming unit of the second active physical erasing unit 410(F+1). And then, the memory control circuit unit 104 (or memory management circuit 202) may map the 0th logical sub-unit, which is corresponding to the second data UD2, in the second logical unit LBA(Z+1) to the 0th physical programming unit, which is stored the second data UD2, in the second active physical erasing unit 410(F+1).

Referring to FIG. 11, as the foregoing example, the memory control circuit unit 104 (or memory management circuit 202) receives the third write command from the host system 1000, and the third data UD3 corresponding to the third write command. At the same time, the host system 1000 indicates storing the third data UD3 into the third logical unit LBA(Z+2) through the third write command, and the third data UD3 belongs to the 1st logical sub-unit of the third logical unit LBA(Z+2). And, the memory control circuit unit 104 (or memory management circuit 202) may first determine whether the third logical unit LBA(Z+2) belongs to the first area. In this example, because the third logical unit LBA(Z+2) belongs to the second area and the second active physical erasing unit 410(F+1) in the data area 502 has enough space (two empty physical programming units) to write the third data UD3 (one logical sub-unit size), the memory control circuit unit 104 (or memory management circuit 202) may directly write the third data UD3 into the second active physical erasing unit 410(F+1). And, because the 0th physical programming unit of the second active physical erasing unit 410(F+1) is already stored the second data UD2, the memory control circuit unit 104 (or memory management circuit 202) may select a physical programming unit which is the next of the physical programming unit written the second data UD2 to write the third data UD3. For example, in FIG. 11, the 1st programming unit of the second active physical erasing unit 410(F+1) is used for writing the thirds data UD3. And then, the memory control circuit unit 104 (or memory management circuit 202) may map the 1st logical sub-unit, which is corresponding to the third data UD3, in the third logical unit LBA(Z+2) to the 1st physical programming unit, which is stored the third data UD3, in the second active physical erasing unit 410(F+1).

It should be mentioned, in the other exemplary embodiment, because the writing counts of the logical units in logical area LZ(0) are larger than the writing counts of the logical units in logical area LZ(1), and the writing counts of the logical units in logical area LZ(1) are larger than the writing counts of the logical units in logical area LZ(2), and etc., the memory control circuit unit 104 (or memory management circuit 202) may group the logical areas LZ(0) and LZ(1) into the first area, or, from the first logical area, group front a predetermined amounts of the logical areas into the first area, according to the order of the logical areas LZ(0)~LZ(M). In another exemplary embodiment, it may sort the logical units LBA(0)~LBA(H) from large to small first according to the writing counts, and then group front a predetermined number of the logical units into the first area. The foregoing example is only for describing the concept of the present invention that grouping some amounts of the logical units which have more writing count into the first area to perform the following operation, but not for being construed as limitations to the present invention.

Moreover, in the exemplary embodiment, the memory control circuit unit 104 (or memory management circuit 202) may record the writing counts of each of the logical units LBA(0)~LBA(H) in a predetermined period. That is to say, the memory control circuit unit 104 (or memory management circuit 202) may record the writing counts of each of the logical units when the predetermined period begins, and zeroize the writing counts of each of the logical units when the predetermined period ends. And, re-record the writing counts of each of the logical units when the next predetermined period begins. In the exemplary embodiment, the predetermined period may be a fixed piece of using time or the times of receiving the write command from the host system 1000.

For example, when the predetermined period is the fixed piece of using time, when the memory storage apparatus is operated, the memory control circuit unit 104 (or memory management circuit 202) may start to record the writing counts of each of the logical units. When the memory storage apparatus is operated for a predetermined time, for example, 3600 seconds, the memory control circuit unit 104 (or memory management circuit 202) may zeroize the recorded writing counts of each of the logical units, and re-record the writing counts of each of the logical units within next 3600 seconds.

And, in another example of the predetermined period, the predetermined period is a predetermined threshold value corresponding to the times of receiving the write commands from the host system 1000, and the memory control circuit unit 104 (or memory management circuit 202) may, in every period for receiving a predetermined number the write commands, record the writing counts of each of the logical units. To be more specific, when the memory control circuit unit 104 (or memory management circuit 202) receives a write command, the memory control circuit unit 104 (or memory management circuit 202) starts to record the writing counts of each of the logical units. When the times of receiving the write commands is equal to the predetermined threshold value, for example, 10000 times, the memory control circuit unit 104 (or memory management circuit 202) may zeroize the recorded writing counts of each of the logical units, and re-record the writing counts of each of the logical units in the next predetermined period.

Moreover, in another exemplary embodiment, the memory control circuit unit 104 (or memory management circuit 202) may further first record the recorded writing counts of every time interval and the time/order of ending the recording of every predetermined time interval, and sum up multiple recorded writing counts of the predetermined time intervals from the latest one to the oldest one according to the time/order of ending the recording. And, the value of the sum may represent the recent updating frequency of every logical unit. For example, it assumed that, every 3600 seconds, the predetermined time interval, the first logical unit is recorded the sum of writing counts in every predetermined time interval one time. It's like, in the first predetermined time interval, the sum of writing counts is 100 times; in the second predetermined time interval, the sum of writing counts is 50 times; in the third predetermined time interval, the sum of writing counts is 60 times. And, the memory control circuit unit 104 (or memory management circuit 202) is configured to only take sums of the writing counts of the latest two predetermined time intervals, that is, the 110 times (50 times plus 60 times) as the writing counts of a predetermined period of this logical unit. And, in this exemplary embodiment, the memory control circuit unit 104 (or memory management circuit 202) may further only record the writing counts of a predetermined number of the recent predetermined time intervals to obtain the effect of the foregoing example.

It should be mentioned, the foregoing example is used for describing the effect that, in the present invention, the memory control circuit unit 104 (or memory management circuit 202) may record the wring counts of every logical unit during a recent using period or during a number of the recent using times to fit the recent using habit of the memory storage apparatus to gather and store the data which is updated often to one physical erasing unit, and increase the efficiency of the garbage collection operation of the memory storage apparatus, and the invention is not limited thereto.

Figure 12:
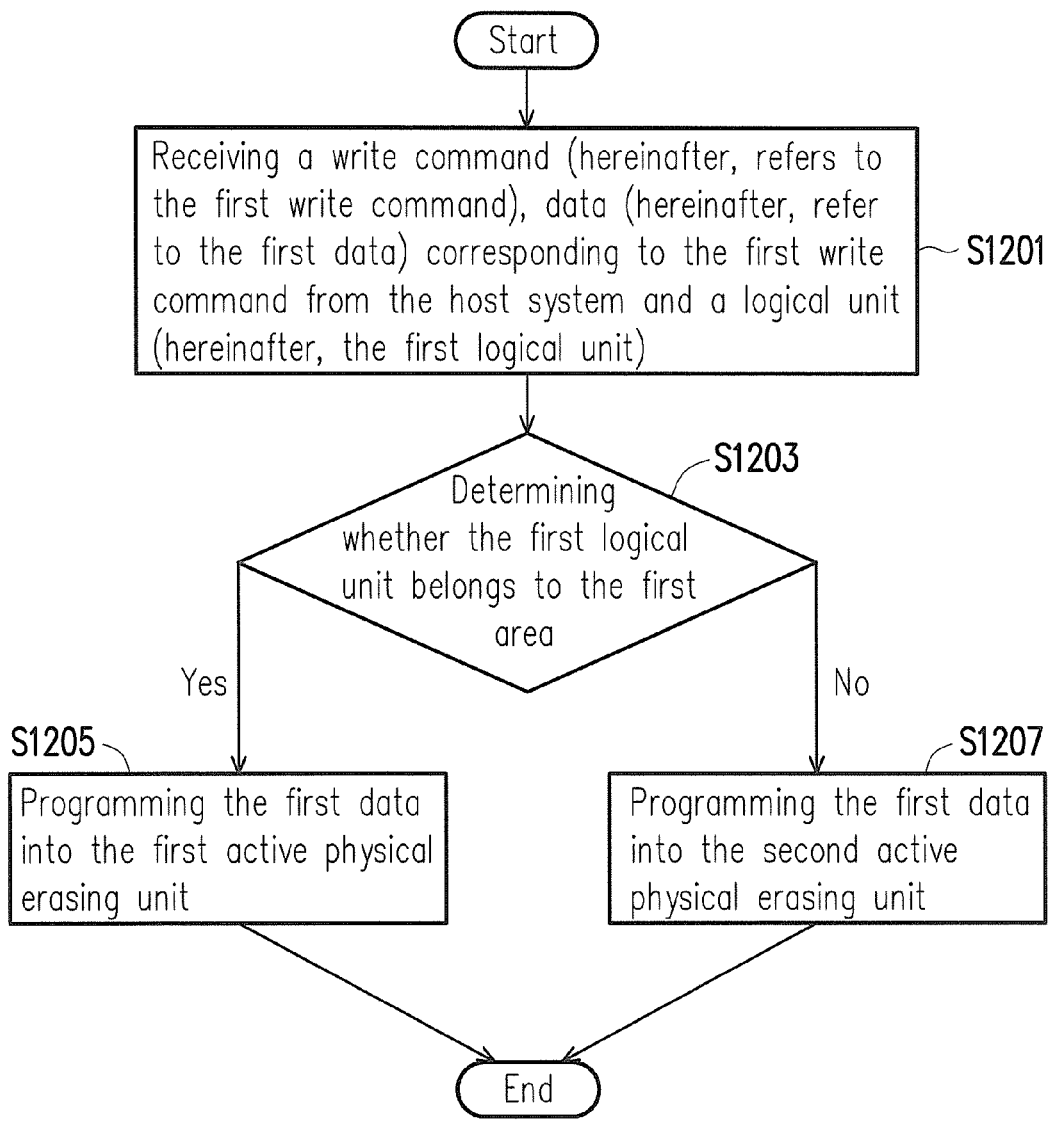
FIG. 12 is a flowchart of writing data according to the first exemplary embodiment.

FIG. 12 is a flowchart of writing data according to the first exemplary embodiment.

Referring to FIG. 12, in step S1201, the memory control circuit unit 104 (or memory management circuit 202) receive a write command (hereinafter, refers to the first write command), data (hereinafter, refer to the first data) corresponding to the first write command from the host system 1000 and a logical unit (hereinafter, the first logical unit) And, in the step S1203, the memory control circuit unit 104 (or memory management circuit 202) may determine whether the first logical unit belongs to the first area.

If, in the step S1203, the memory control circuit unit 104 (or memory management circuit 202) determines that the first logical unit belongs to the first area, in the step S1205, the memory control circuit unit 104 (or memory management circuit 202) may program the first data into the first active physical erasing unit. Otherwise, if the memory control circuit unit 104 (or memory management circuit 202) determines that the first logical unit does not belong to the first area in the step S1203, and then, in the step S1207, the memory control circuit unit 104 (or memory management circuit 202) may program the first data into the second active physical erasing unit.

[Second Exemplary Embodiment]

The hardware structure of the second exemplary embodiment is similar as the one of the first exemplary embodiment, and the difference between the second exemplary embodiment and the first exemplary embodiment is that, in the first exemplary embodiment, it determines whether the logical area which is belonged to the logical unit corresponding to the received data belongs to the first area first, and then determines that storing the received data into the first active physical erasing unit or the second active physical erasing unit. And, in the second exemplary embodiment, it first, according to the data type of the received data which is intended to be written, determines whether the logical area which is belonged to the logical unit corresponding to the received data belongs to the first area and then determines to store the received data into the first active physical erasing unit or the second active physical erasing unit. It will use the reference numbers of the elements of the first exemplary embodiment to describe the difference of the second exemplary embodiment below.

As the foregoing description, the memory control circuit unit 104 (or memory management circuit 202) may group a plurality of logical units LBA(0)~LBA(H) of the rewritable non-volatile memory module 106 into a plurality of logical areas LZ(0)~LZ(M). In the exemplary embodiment, the memory control circuit unit 104 (or memory management circuit 202) may assign the logical area to which the logical units corresponding to the writing data belong according to the data type of every writing data. That is, when one of the logical units LBA(0)~LBA(H) is used for storing the data of the file system of the operation system of the host system 1000, the memory control circuit unit 104 (or memory management circuit 202) may group this logical unit into the first area and group the logical units which are not used for storing the data of the file system of the operation system of the host system 1000 into the second area.

For example, it assume that when the logical unit LBA(0) among the logical units LBA(0)~LBA(H) is used for storing the data of the file system of the operation system of the host system 1000, the memory control circuit unit 104 (or memory management circuit 202) may group logical unit LBA(0) into the first area, such as the logical area LZ(0) which is grouped into the first area in the foregoing example. Moreover, when the logical unit LBA(Z+1) among the a plurality of logical units LBA(0)~LBA(H) is used for storing the data which does not belong to the file system of the operation system of the host system 1000, the memory control circuit unit 104 (or memory management circuit 202) may group the logical unit LBA(Z+1) into one of the logical areas LZ(1)~LZ(M) which are group into the second area, such as the logical area LZ(1). And then, the memory control circuit unit 104 (or memory management circuit 202) may write the data into the first active physical erasing unit or second active physical erasing unit by determining whether the logical unit corresponding the data belongs to the first area.

[Third Exemplary Embodiment]

The hardware structure of the third exemplary embodiment is similar as the one of the first, the second exemplary embodiments, and the difference between the third exemplary embodiment and the first, the second exemplary embodiments is that, in the third exemplary embodiment, it determines the type of the received data, and then according the result of the determination, decides that the first active physical erasing unit or the second active physical erasing unit is about to program the received data. It will use the reference numbers of the elements of the first exemplary embodiment to describe the difference of the third exemplary embodiment below.

In the exemplary embodiment, the memory control circuit unit 104 (or memory management circuit 202) may determine whether the first active physical erasing unit or second active physical erasing unit is written with the data according to the type of the received data. Specifically, when the received writing data belongs to the file system of the operation system of the host system 1000, the memory control circuit unit 104 (or memory management circuit 202) may directly write this writhing data into the first active physical erasing unit. In other words, when the received writing data does not belong to the data of the file system of the operation system of the host system 1000, the memory control circuit unit 104 (or memory management circuit 202) may directly write this writing data into the second active physical erasing unit.

For example, when the memory control circuit unit 104 (or memory management circuit 202) receives a write command (hereinafter, refers to the first write command), and data (hereinafter, refer to the first data) corresponding to the first write command, from the host system 1000. And, the memory control circuit unit 104 (or memory management circuit 202) may first determine what the type of the first data is. If the memory control circuit unit 104 (or memory management circuit 202) determines that the first data belongs to the file system of the operation system of the host system 1000, the memory control circuit unit 104 (or memory management circuit 202) may write the first data into the physical programming units of the first active physical erasing unit 410(F), and map a plurality of logical sub-units, which are corresponding to the first data, to the physical programming units, which are stored the first data, in the first active physical erasing unit 410(F). In the other words, if the memory control circuit unit 104 (or memory management circuit 202) determines that the first data does not belong to the data of the file system of the operation system of the host system 1000, the memory control circuit unit 104 (or memory management circuit 202) may write the first data into the a plurality of physical programming units of the second active physical erasing unit 410(F+1), and map logical sub-units, which are corresponding to the first data, to the physical programming units, which are stored the first data, in the second active physical erasing unit 410(F+1).

In the exemplary embodiment, when the received first data belongs to the file allocation table, the memory control circuit unit 104 (or memory management circuit 202) may directly determine the first data is the data belonging to the file system of the operation system of the host system 1000.

In another exemplary embodiment, the memory control circuit unit 104 (or memory management circuit 202) may determine whether the writing data belongs to the data of the file system of the operation system of the host system 1000 according to the number of logical sub-units corresponding to the received writing data. Specifically, if the number of the logical sub-units corresponding to the received writing data is smaller than a logical sub-unit number threshold value, the memory control circuit unit 104 (or memory management circuit 202) may determine that the writing data belongs to the file system of the operation system of the host system 1000. In other words, if the number of the logical sub-units corresponding to the received writing data is not smaller than a logical sub-unit number threshold value, the memory control circuit unit 104 (or memory management circuit 202) may determine that the writing data does not belong to the file system of the operation system of the host system 1000.

Moreover, in another exemplary embodiment, the memory control circuit unit 104 (or memory management circuit 202) may determine whether the writing data belongs to the file system of the operation system of the host system 1000 according to the addresses of logical sub-units corresponding to the received writing data. Specifically, if the addresses of the logical sub-units corresponding to the received writing data are in a front predetermined section of the logical unit which is belonged to these logical sub-units, the memory control circuit unit 104 (or memory management circuit 202) may determine that the writing data belongs to the file system of the operation system of the host system 1000. In other words, when the addresses of the logical sub-units corresponding to the received writing data are not in a front predetermined section of the logical unit which is belonged to these logical sub-units, the memory control circuit unit 104 (or memory management circuit 202) may determine that the writing data does not belong to the file system of the operation system of the host system 1000.

Figure 13:
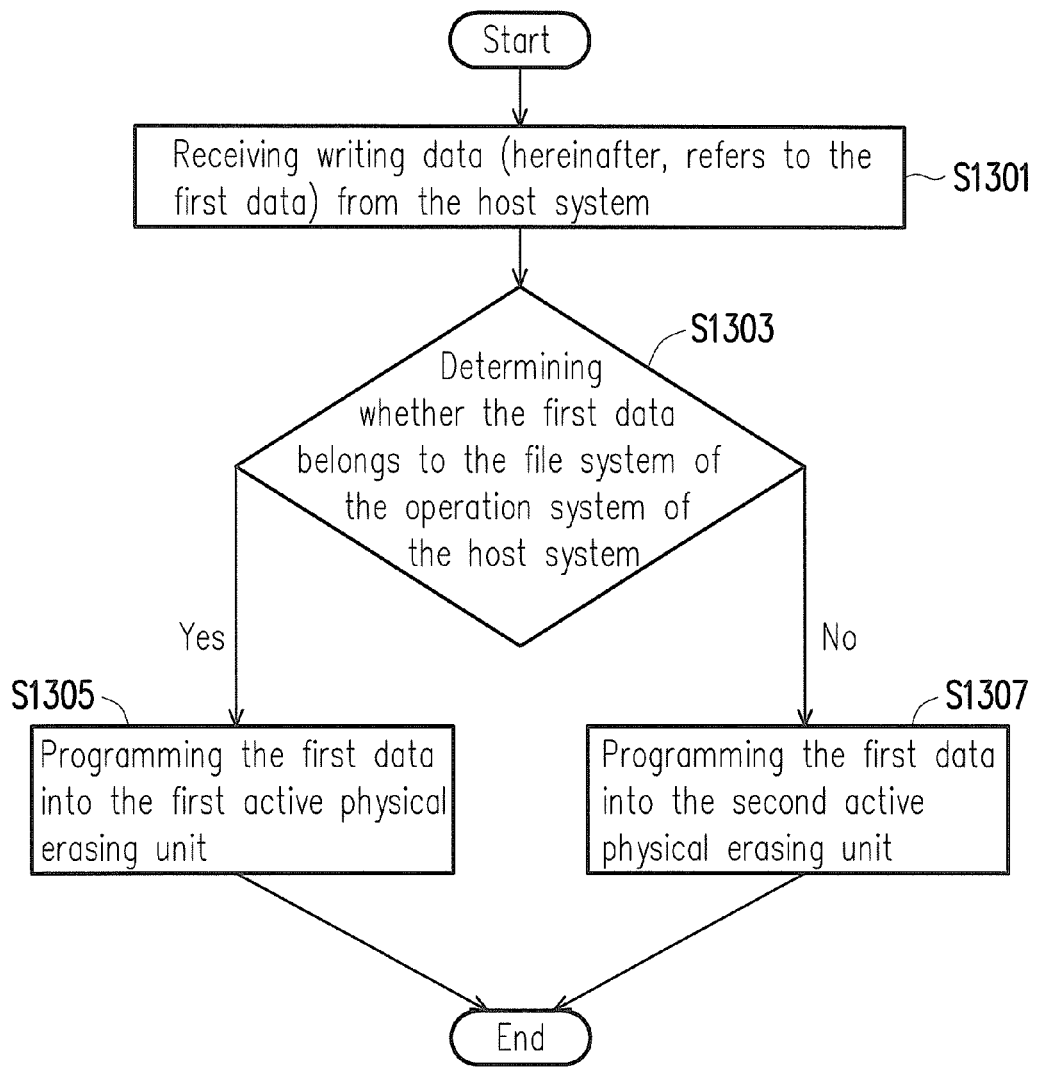
FIG. 13 is a flowchart of writing data according to the third exemplary embodiment.

FIG. 13 is a flowchart of writing data according to the third exemplary embodiment.

Referring to FIG. 13, in the step S1301, the memory control circuit unit 104 (or memory management circuit 202) receives a writing data (hereinafter, refers to the first data) from the host system 1000. And then, in the step S1303, the memory control circuit unit 104 (or memory management circuit 202) may determine whether the first data belongs to the file system of the operation system of the host system 1000.

If, in the step S1303, the memory control circuit unit 104 (or memory management circuit 202) determines that the first data belongs to the file system of the operation system of the host system 1000, the memory control circuit unit 104 (or memory management circuit 202) then, in the step S1305, may program the first data into the first active physical erasing unit. Moreover, in the step S1303, if the memory control circuit unit 104 (or memory management circuit 202) determines that the first data does not belong to the file system of the operation system of the host system 1000, the memory control circuit unit 104 (or memory management circuit 202) then, in the step S1307, may program the first data into the second active physical erasing unit.

Accordingly, the foregoing exemplary embodiments may gather and store the data corresponding to the logical unit which has high writing counts into the first active physical erasing unit, and the updating frequency of the data corresponding to the logical unit which has high writing counts would also be higher. The foregoing exemplary embodiments also let the data of the file system of the operation system of the host system be gathered and stored into the first active physical erasing unit, so that, because the updating frequency of the data of the file system is higher, the updating possibility of the data stored into the first active physical erasing unit is higher, too. That is, the ratio of the data stored in the first active physical erasing unit being the invalid data is higher.

Therefore, in the foregoing exemplary embodiments, the amounts of the valid data for being moved would decrease when performing the garbage collection operation for the first active physical erasing unit. At the same time, because the updating frequency of the data stored in the second active physical erasing unit is lower, the ratio of the invalid data in the second active physical erasing unit would be lower such that the possibility for performing the garbage collection operation for the second active physical erasing unit is lower, too. So, the foregoing exemplary embodiments may decrease the amounts of data which is needed to be moved during the garbage collection and save the time for performing the garbage collection operation. The foregoing exemplary embodiments may further decrease the times of performing the garbage collection to increase the efficiency of the garbage collection operation such that it may extend the life of the memory storage apparatus. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method for a rewritable non-volatile memory module, wherein the rewritable non-volatile memory module has a plurality of physical erasing units, and each of the physical erasing units has a plurality of physical programming units, the data writing method comprising:
   selecting a physical erasing unit from the plurality of physical erasing units of the rewritable non-volatile memory module as a first active physical erasing unit;
   selecting another physical erasing unit from the plurality of physical erasing units of the rewritable non-volatile memory module as a second active physical erasing unit;
   grouping a plurality of logical units configured on the rewritable non-volatile memory module into a first area and at least one second area;
   receiving a write command indicating storing first data into a first logical unit among the logical units from a host system and determining whether the first logical unit belongs to the first area or the second area;
   if the first logical unit belongs to the first area, programming the first data into the first active physical erasing unit;
   if the first logical unit belongs to the second area, programming the first data into the second active physical erasing unit;
   if a write command indicating storing second data into a second logical unit among the logical units is received from the host system and the second logical unit belongs to the second area, programming the second data into the second active physical erasing unit; and
   if a write command indicating storing third data into a third logical unit among the logical units is received from the host system and the third logical unit belongs to the second area, programming the third data into the second active physical erasing unit.

2. The data writing method according to claim 1, wherein the step of grouping the plurality of logical units configured on the rewritable non-volatile memory module into the first area and the at least one second area comprises:
   grouping the logical units into the first area and the at least one second area according to updating frequencies of the logical units.

3. The data writing method according to claim 2, wherein the step of grouping the logical units into the first area and the at least one second area according to the updating frequencies of the logical units comprises:
   recording a writing count of each of the logical units; and
   grouping the logical units into the first area and the at least one second area according to the writing counts of the logical units.

4. The data writing method according to claim 3, wherein the step of grouping the logical units into the first area and the at least one second area according to the writing counts of the logical units comprises:
   grouping at least one logical unit of the logical units into the first area according to the writing counts corresponding to the logical units, wherein the writing count of the at least one logical unit is larger than the writing counts of other logical units among the logical units; and
   grouping the other logical units into the second area.

5. The data writing method according to claim 3, wherein the step of recording the writing count of each of the logical units comprises:
   recording the writing counts corresponding to the logical units within a predetermined period.

6. The data writing method according to claim 3, wherein the step of grouping the plurality of logical units configured on the rewritable non-volatile memory module into the first area and the at least one second area comprises:
   grouping at least one logical unit storing data belonging to a file system of an operation system of the host system among the logical units into the first area; and
   grouping other logical units besides the at least one logical unit among the logical units into the second area.

7. A memory control circuit unit for controlling a rewritable non-volatile memory module, the memory control circuit unit comprising:
   a host interface, configured to couple to a host system;
   a memory interface, configured to couple to the rewritable non-volatile memory module, wherein the rewritable non-volatile memory module has a plurality of physical erasing units, and each of the physical erasing units has a plurality of physical programming units; and
   a memory management circuit, coupled to the host interface and the memory interface, wherein the memory management circuit is configured to select a physical erasing unit from the plurality of physical erasing units of the rewritable non-volatile memory module as a first active physical erasing unit,
   wherein the memory management circuit is further configured to select another physical erasing unit from the plurality of physical erasing units of the rewritable non-volatile memory module as a second active physical erasing unit,
   wherein the memory management circuit is further configured to group a plurality of logical units configured on the rewritable non-volatile memory module into a first area and at least one second area,
   wherein the memory management circuit is further configured to receive a write command indicating storing first data into a first logical unit among the logical units from a host system and determine whether the first logical unit belongs to the first area or the second area,
   wherein if the first logical unit belongs to the first area, the memory management circuit is further configured to give a first command sequence to the rewritable non-volatile memory module to program the first data into the first active physical erasing unit, wherein if the first logical unit belongs to the second area, the memory management circuit is further configured to give another command sequence to the rewritable non-volatile memory module to program the first data into the second active physical erasing unit, wherein if a write command indicating storing second data into a second logical unit among the logical units is received from the host system and the second logical unit belongs to the second area, the memory management circuit is further configured to give a second command sequence to the rewritable non-volatile memory module to program the second data into the second active physical erasing unit, wherein if a write command indicating storing third data into a third logical unit among the logical units is received from the host system and the third logical unit belongs to the second area, the memory management circuit is further configured to give a third command sequence to the rewritable non-volatile memory module to program the third data into the second active physical erasing unit.

8. The memory control circuit unit according to claim 7, wherein in the operation of grouping the plurality of logical units configured on the rewritable non-volatile memory module into the first area and the at least one second area, the memory management circuit groups the logical units into the first area and the at least one second area according to updating frequencies of the logical units.

9. The memory control circuit unit according to claim 8, wherein in the operation of grouping the logical units into the first area and the at least one second area according to the updating frequencies of the logical units, the memory management circuit records a writing count of each of the logical units, and groups the logical units into the first area and the at least one second area according to the writing counts of the logical units.

10. The memory control circuit unit according to claim 9, wherein in the operation of grouping the logical units into the first area and the at least one second area according to the writing counts of the logical units, the memory management circuit groups at least one logical unit of the logical units into the first area according to the writing counts of the logical units, and group other logical units among the logical units into the second area, wherein the writing count of the at least one logical unit are larger than the writing counts of the other logical units.

11. The memory control circuit unit according to claim 9, wherein in the operation of recording the writing count of each of the logical units, the memory management circuit records the writing counts corresponding to the logical units within a predetermined period.

12. The memory control circuit unit according to claim 9, wherein in the operation of grouping the logical units configured on the rewritable non-volatile memory module into the first area and the at least one second area, the memory management circuit groups at least one logical unit storing data belonging to a file system of an operation system of the host system among the logical units into the first area, and groups other logical units besides the at least one logical unit among the logical units into the second area.

13. A memory storage apparatus, comprising:

a connection interface unit, configured to couple to a host system;

a rewritable non-volatile memory module, wherein the rewritable non-volatile memory module has a plurality of physical erasing units, and each of the physical erasing units has a plurality of physical programming units; and a memory control circuit unit, coupled to the connection interface unit and the rewritable non-volatile memory module, wherein the memory control circuit unit is configured to select a physical erasing unit from the plurality of physical erasing units of the rewritable non-volatile memory module as a first active physical erasing unit, wherein the memory control circuit unit is further configured to select another physical erasing unit from the plurality of physical erasing units of the rewritable non-volatile memory module as a second active physical erasing unit, wherein the memory control circuit unit is further configured to group a plurality of logical units configured on the rewritable non-volatile memory module into a first area and at least one second area, wherein the memory control circuit is further configured to receive a write command indicating storing first data into a first logical unit among the logical units from a host system and determine whether the first logical unit belongs to the first area or the second area, wherein if the first logical unit belongs to the first area, the memory control circuit unit is further configured to program the first data into the first active physical erasing unit, wherein the host system indicates storing the first data into a first logical unit among the logical units and the first logical unit belongs to the first area, wherein if the first logical unit belongs to the second area, the memory control circuit is further configured to give another command sequence to the rewritable non-volatile memory module to program the first data into the second active physical erasing unit, wherein if a write command indicating storing second data into a second logical unit among the logical units is received from the host system and the second logical unit belongs to the second area, the memory control circuit unit is further configured to program the second data into the second active physical erasing unit, wherein the host system indicates storing the second data into a second logical unit among the logical units and the second logical unit belongs to the second area, wherein if a write command indicating storing third data into a third logical unit among the logical units is received from the host system and the third logical unit belongs to the second area, the memory control circuit unit is further configured to program the third data into the second active physical erasing unit, wherein the host system indicates storing the third data into a third logical unit among the logical units and the third logical unit belongs to the second area.

14. The memory storage apparatus according to claim 13, wherein in the operation of grouping the plurality of logical units configured on the rewritable non-volatile memory module into the first area and the at least one second area, the memory control circuit unit groups the logical units into the first area and the at least one second area according to updating frequencies of the logical units.

15. The memory storage apparatus according to claim 14, wherein in the operation of grouping the logical units into the first area and the at least one second area according to the updating frequencies of the logical units, the memory control circuit unit records a writing count of each of the logical units, groups the logical units into the first area and the at least one second area according to the writing counts of the logical units.

16. The memory storage apparatus according to claim 15, wherein in the operation of grouping the logical units into the first area and the at least one second area according to the writing counts of the logical units, the memory control circuit unit groups at least one logical unit among the logical units into the first area according to the writing counts of the logical units, and groups other logical units among the logical units into the second area, wherein the writing count of the at least one logical unit is larger than the writing counts of the other logical units.

17. The memory storage apparatus according to claim 15, wherein in the operation of recording the writing counts of each of the logical units, the memory control circuit unit records the writing counts corresponding to the logical units within a predetermined period.

18. The memory storage apparatus according to claim 15, wherein in the operation of grouping the plurality of logical units configured on the rewritable non-volatile memory module into the first area and the at least one second area, the memory control circuit unit groups at least one logical unit storing data belonging to a file system of an operation system of the host system among the logical units into the first area, and groups other logical units besides the at least one logical unit among the logical units into the second area.

\* \* \* \* \*